(12) United States Patent
Choi et al.

(10) Patent No.: US 12,176,799 B2
(45) Date of Patent: Dec. 24, 2024

(54) NON-ROTATING ALTERNATING CURRENT GENERATING DEVICE

(71) Applicants: Woo Hee Choi, Seoul (KR); Nan Kyung Hwang, Seoul (KR); Hyung Ju Yoo, Seoul (KR); Sung Kwon Yu, Seoul (KR)

(72) Inventors: Woo Hee Choi, Seoul (KR); Nan Kyung Hwang, Seoul (KR); Hyung Ju Yoo, Seoul (KR); Sung Kwon Yu, Seoul (KR)

( * ) Notice: Subject to any disclaimer, the term of this patent is extended or adjusted under 35 U.S.C. 154(b) by 222 days.

(21) Appl. No.: 17/925,134

(22) PCT Filed: Apr. 2, 2021

(86) PCT No.: PCT/KR2021/004152
§ 371 (c)(1),
(2) Date: Nov. 14, 2022

(87) PCT Pub. No.: WO2021/230496
PCT Pub. Date: Nov. 18, 2021

(65) Prior Publication Data
US 2023/0198368 A1    Jun. 22, 2023

(30) Foreign Application Priority Data

May 13, 2020  (KR) .................. 10-2020-0057044
May 13, 2020  (KR) .................. 10-2020-0057048

(51) Int. Cl.
*H01F 3/12*    (2006.01)
*H01F 3/10*    (2006.01)
*H02K 1/06*    (2006.01)
*H02K 99/00*   (2014.01)
*H02P 9/02*    (2006.01)

(52) U.S. Cl.
CPC .............. *H02K 99/10* (2016.11); *H01F 3/10* (2013.01); *H01F 3/12* (2013.01); *H02K 1/06* (2013.01); *H02P 9/02* (2013.01)

(58) Field of Classification Search
CPC ... H01F 3/10; H01F 3/12; H01F 30/12; H01F 27/263; H02M 7/003; H02M 7/42–7/525
See application file for complete search history.

(56) References Cited

FOREIGN PATENT DOCUMENTS

| | | |
|---|---|---|
| JP | 2000353627 | 12/2000 |
| KR | 20140078732 | 6/2014 |
| KR | 101913746 | 10/2018 |

*Primary Examiner* — Ramon M Barrera
(74) *Attorney, Agent, or Firm* — IPLA P.A.

(57) ABSTRACT

A non-rotating alternating current (AC) generating device for generating an AC current, includes: two or more generator units which are placed next to each other, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece.

17 Claims, 13 Drawing Sheets

NON-ROTATING ALTERNATING CURRENT GENERATING DEVICE

BACKGROUND

The present invention relates to a non-rotating alternating current (AC) generating device, and more particularly, to a non-rotating alternating current (DC) generating device capable of generating alternating current with high efficiency with a plurality of generating units.

Also, the present invention relates to a non-rotating alternating current (AC) generating device, and more particularly, to a non-rotating alternating current (DC) generating device capable of generating alternating current with plural phrases in which it is constructed by non-rotating type and three-phases alternating current.

An electric generator mainly refers to a device that converts mechanical energy into electrical energy, and it is also referred to as a DC generator, a synchronous generator, and an induction generator according to its operation method or operating principle. A generator basically includes an armature for generating and outputting a current and a field magnet for generating a magnetic field. The generator generates a current flow in the armature by rotating the armature with respect to the field magnet or rotating the field magnet with respect to the armature while forming a magnetic field by supplying DC power to the field magnet. At this time, the method of rotating the armature is called a rotating armature type, and the method of rotating the field magnet is called a rotating field magnet type. In such a rotary generator, rotational driving of an armature or field magnet is performed by a separate energy source. As the energy source, an appropriate one is employed depending on the intended use, but generally natural energy such as hydraulic power, wind power, and tidal power, or driving means such as a turbine, an engine, and a motor are used.

In general, direct current has the advantage of being able to easily store electricity, but has a disadvantage in that it is difficult to achieve high power including step-up. In contrast, alternating current has a very low storage property, but has an advantage in that it is easy to increase the voltage and increase the power. As one preferred application of the generator, there is a system configured to generate various AC power by rotating a field magnet or an armature using a stored DC power source such as a battery or another AC power source. Such a power system or power conversion system is widely used as an emergency power means in industries requiring high power, such as hospitals or factories. In addition, such an electric power system may be very usefully employed in an electric vehicle that requires generation of various driving torques according to circumstances while using electricity as an energy source.

As another application method of the generator, there is a system to generate direct current power by generating an induced current through rotation of a field magnet or armature and outputting it through a commutator or a commutator element. Such a power system or power conversion system is widely used in a power supply system for devices using DC power, such as automobiles and aircraft, and a battery charging system for charging a battery used in such devices or facilities.

Conventional generators basically require rotational driving of an armature or a field magnet. These structural features inevitably lead to an increase in the manufacturing cost of the generator along with the structural and mechanical complexity of the generator. In particular, since a large amount of energy loss occurs due to mechanical friction or the like when the armature or field magnet rotates, there is a limit in increasing the power generation efficiency and power conversion efficiency of the generator.

Korean Patent Registration No. 10-1913746 (Title of the Invention: AC power generator with adjustable frequency and voltage), Korean Patent Laid-Open No. 10-2014-0078732 (Title of the Invention: Power Conversion Device), Japanese Patent Laid-Open No. 2000-353627 (Title of the Invention: Insulation converter transformer and switching power supply circuit), etc., have introduced devices or systems designed to perform power conversion without rotating the armature or field magnet. Here, the Korean Patent Registration No. 10-1913746 is particularly noteworthy. In this patent, the frequency and power of the AC power obtained from the armature can be easily adjusted by repeatedly and alternately stacking the armature and the field magnet and controlling the pulse width of the DC power supplied to the field magnet.

SUMMARY OF THE INVENTION

An object of the present invention is to provide a non-rotating alternating current (DC) generating device capable of generating alternating current with high efficiency with a plurality of generating units.

Another technical object of the present invention is to provide a non-rotating alternating current (DC) generating device capable of generating alternating current with plural phrases in which it is constructed by non-rotating type and three-phases alternating current.

Technical Solution

According to a preferred embodiment of the present invention for achieving the above object, it is provided to a non-rotating alternating current (AC) generating device for generating an AC current, comprising two or more generator units which are placed next to each other, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein the generator units are connected in series or parallel to the input and output terminals.

In addition, according to another embodiment of the present invention for achieving the above object, it is provided to a non-rotating alternating current (AC) generating device in which R-phase and S-phase and T-phase alternating current with mutual phase difference are generated, the non-rotating alternating current (AC) generating device comprising a first power generating unit for generating an R-phase alternating current, a second generating unit for generating an S-phase alternating current, and a third power generating unit for generating a T-phase alternating current; wherein in the first to third generating units, a first output terminal is coupled to a neutral wire, and R-phase, S-phase or T-phase AC are outputted through a second output terminal, respectively, wherein the first to third generating units comprises a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein a field current having a mutual phase difference is supplied to each field magnet of the first to third generating units.

Advantageous Effects

According to the present invention as described above, there is an effect that according to the present invention having the above configuration, the non-rotating AC generating device includes a plurality of generating units, each of which is disposed adjacent to each other, and an input side and an output side are respectively coupled in series or parallel. Each generating unit has a structure in which a field magnet and an armature are stacked, and each generating unit operates synchronously with other generating units so that multiple generating units operates as one generating unit. The AC generating device of the present invention provides excellent power generation efficiency by acting synergistically on the magnetic field generated by one generating unit on another generating unit.

In addition, the non-rotating AC generating device according to the present invention includes first to third generating units for generating alternating currents of R-phase, S-phase, and T-phase, and only supplies field magnet currents having a phase difference to these generating units. to create a three-phase alternating current. In addition, in the present invention, the phase difference between R-phase, S-phase, and T-phase alternating current can be arbitrarily adjusted by adjusting the phase of the field magnet current supplied to the first to third generating units, and R-phase, S-phase, and T-phase AC voltage can be set appropriately by adjusting the turns ratio of the field magnet and armature of each generating unit.

BRIEF DESCRIPTION OF DRAWINGS

The drawings attached to this specification are for efficiently explaining the technical configuration of the present invention. It should be understood that some components in the drawings may be simplified or exaggerated for an efficient understanding of the present invention.

FIG. 18a is a waveform diagram showing an example of the field magnet current supplied to the first generating unit 100-1 that generates an R-phase AC among a three-phase AC, FIG. 18b is a waveform diagram showing an example of the field magnet current supplied to the second generating unit 100-2 that generates an S-phase AC among a three-phase AC, FIG. 18c is a waveform diagram showing an example of the field magnet current supplied to the third generating unit 100-3 that generates a T-phase AC among a three-phase AC.

DETAILED DESCRIPTION OF THE INVENTION

Figure 1:
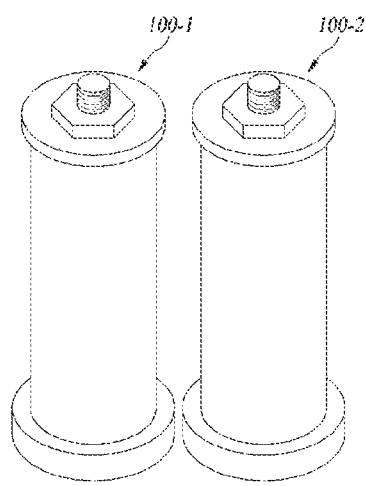
FIGS. 1 to 3 are perspective views schematically showing a configuration example of a non-rotating AC generating device according to a first embodiment of the present invention.

According to a preferred embodiment of the present invention for achieving the above object, it is provided to a non-rotating alternating current (AC) generating device for generating an AC current, comprising two or more generator units which are placed next to each other, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein the generator units are connected in series or parallel to the input and output terminals.

In addition, according to another embodiment of the present invention for achieving the above object, it is provided to a non-rotating alternating current (AC) generating device in which R-phase and S-phase and T-phase alternating current with mutual phase difference are generated, the non-rotating alternating current (AC) generating device comprising a first power generating unit for generating an R-phase alternating current, a second generating unit for generating an S-phase alternating current, and a third power generating unit for generating a T-phase alternating current; wherein in the first to third generating units, a first output terminal is coupled to a neutral wire, and R-phase, S-phase or T-phase AC are outputted through a second output terminal, respectively, wherein the first to third generating units comprises a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein a field magnet current having a mutual phase difference is supplied to each field magnet of the first to third generating units.

In addition, a hollow is provided along the longitudinal direction at the central portion of the core member.

In addition, an insulating material is further disposed between the core member and the first or second hollow part.

In addition, the insulating plate is composed of a high elasticity material.

In addition, the core member or the pole piece are characterized in that the heat treatment is performed while being composed of pure iron.

In addition, wherein in the generating unit and the other generating units, the pole pieces are integrally configured.

In addition, wherein in the generating unit and the other generating units, the insulating plates are integrally configured.

In addition, the plurality of the field magnet and the armature is provided, and the field magnet and the armature are alternately arranged.

In addition, the plurality of armatures is connected in series with each other.

In addition, the plurality of field magnets is divided into a first field magnet group and a second field magnet group, and the first field magnet group and the second field magnet group are driven alternately to form a first magnetic field and a second magnetic field, respectively, and the first magnetic field and the second magnetic field have mutually opposite directions.

In addition, at least one of the generating units is different in size from the other.

In addition, according to another embodiment of the present invention, it is provided to a non-rotating alternating current (AC) generating device for generating multi-phase AC current with mutual phase differences, comprising a plurality of generator units for generating alternating currents with different phases, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein a field magnet current having a mutual phase difference is supplied to each field magnet of the plurality of generating units.

MODE FOR INVENTION

Hereinafter, an embodiment of the present invention will be described with reference to the drawings. However, the examples described below are illustrative of preferred embodiments of the present invention, and the examples of these examples are not intended to limit the scope of the present invention. Those skilled in the art will readily understand that the present invention can be implemented with various modifications without departing from the technical spirit thereof.

In addition, the present invention can be equally applied to an AC generating device for generating multi-phase alternating current, including three-phase alternating current of R phase, S phase, and T phase. However, hereinafter, for convenience of explanation, a case in which the present invention is applied to a three-phase AC generator will be described as an example.

Figure 2:
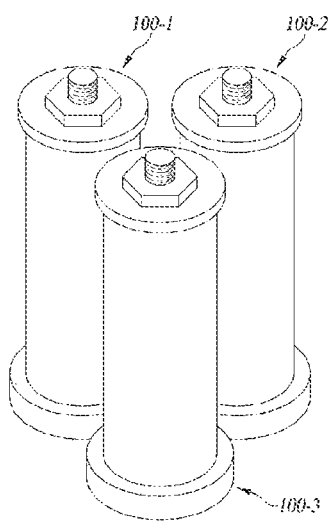
Figure 3:
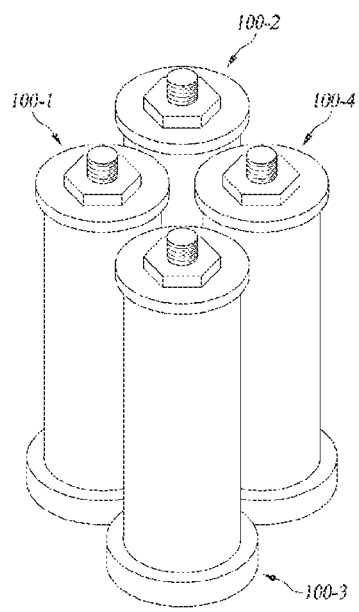

FIGS. 1 to 3 are perspective views illustrating a configuration example of a non-rotating AC generating device according to a first embodiment of the present invention. The AC generating device according to the present invention is configured with a plurality of generating units (100:100-1 to 100-$n$). FIGS. 1 to 3 are each one embodiment of the present invention, FIG. 1 is two generating units (100-1, 100-2), FIG. 2 is three generating units (100-1~100-3), FIG. 3 shows a case in which there are four generating units 100-1 to 100-4. In the present invention, the number of generating units 100 is not limited to a specific value. Each generating unit 100 is preferably configured in a cylindrical shape. However, the shape of the generating unit 100 is not limited to a specific one. The generating unit 100 may be configured in a polygonal column shape including a triangle or a quadrangle. These generating units 100 are preferably disposed as close to each other as possible within a range in which electric leakage or sparks do not occur between them. And, although not specifically shown in the drawings, the generating unit 100 has an input terminal and an output terminal electrically connected in series or in parallel. A DC field magnet current is supplied to each generating unit 100 through an input terminal, and the generating unit 100 generates and outputs AC power based on this.

Figure 4:
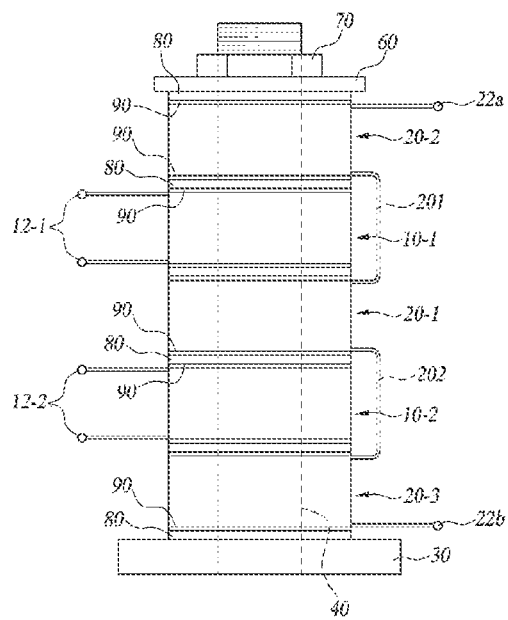
FIG. 4 is a front view showing the configuration of the generating unit 100 constituting the non-rotational AC generating device.
Figure 5:
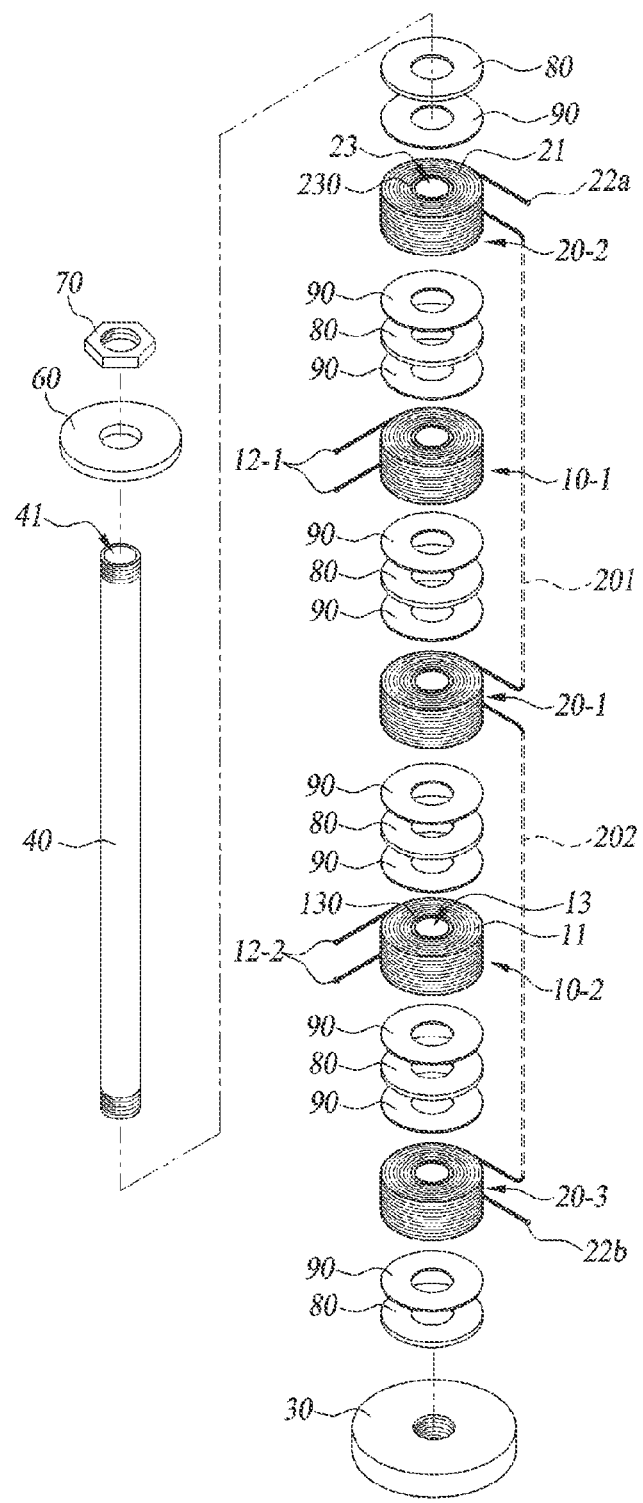
FIG. 5 is an exploded perspective view of the generating unit 100 shown in FIG. 4.

FIG. 4 is a front view showing an example configuration of the generating unit 100, and FIG. 5 is an exploded perspective view thereof. In the drawing, the generating unit 100 includes a base member 30 and a rod-shaped core member 40 coupled to a central portion of the base member 30. And on the core member 40 along the outer peripheral surface of the field magnet (10: 10-1, 10-2) and the armature (20: 20-1, 20-2, 20-3) are alternately stacked or combined, the generating unit 100 as a whole constitutes one non-rotating type generator.

The core member 40 is preferably provided with a hollow 41 in the longitudinal direction. The hollow 41 is to prevent improper accumulation of thermal energy in the core member 41 by allowing air to smoothly flow through the inner side of the core member 41.

The field magnet 10 and the armature 20 are each formed by winding conductive lines 11 and 21 coated with an insulating material. Here, as the conductive line, for example, a polyurethane copper wire, a polyester copper wire, a polyamide imide (PAI) copper wire, a polyester imide copper wire, etc. may be preferably employed. The field magnet 10 is provided with an input terminal (12: 12-1, 12-2) for supplying a field magnet current. The armature 20 is coupled in series with respect to the output terminals 22*a* and 22*b*, and an induced current, that is, an alternating current generated in the armature 20, is drawn from the output terminals 22*a* and 22*b*. Alternatively, the armature 20 is coupled in series with respect to the first and second output terminals 22*a*, 22*b*, and the induced current from the output terminals 22*a*, 22*b*, that is, alternating current of the R phase, S phase or T phase generated in the armature 20 is drawn. The turns ratio of the field magnet 10 and the armature 20 will be appropriately set according to the field magnet power and the output power. In addition, as another embodiment of the present invention, the armature 20 may be coupled in parallel with respect to the output terminals 22*a* and 22*b* or may be connected in a mixed manner of series and parallel. A wiring method for the input terminal 12 and the output terminals 22*a* and 22*b* of the generating unit 100 is not limited to a specific method.

The field magnet 10 and the armature 20 are formed in a cylindrical shape with hollow parts 13 and 23 in the central part as a whole, and the field magnets 10-1 and 10-2 and the armatures 20-1 to 20-3 is preferably coated with insulating materials 130 and 230 on the inner circumferential surface, respectively. The insulating materials 130 and 230 are formed between the field magnets 10-1 and 10-2 and the armatures 20-1 to 20-3 and the core member 40 inserted through the hollow portions 13 and 23 thereof. It is adopted for more reliable insulation. The shapes of the field magnet 10 and the armature 20 are not limited to specific ones. For example, the field magnet 10 and the armature 20 may be configured in an elliptical shape or a polygonal shape. In addition, the shapes of the hollow parts 13 and 23 of the field magnet 10 and the armature 20 and the shape of the core member 40 are not limited to a specific thing. These are formed in a shape corresponding to each other, so that the core member 40, the field magnet 10, and the armature 20 can be arranged as closely as possible as a whole.

The first to third armatures 20-1 to 20-3 have substantially the same configuration and are coupled in series or parallel with each other to act as one armature as a whole. In this example, in all of the first to third armatures 20-1 to 20-3, the line 11 is wound in the same direction, and one output end of the first armature 20-1 is electrically coupled to the other output terminal of the second armature 20-2 through the connecting line 201, the other output terminal of the first armature 20-1 is electrically coupled to one output terminal of the third armature 20-3 through the connection line 202. More specifically, the first to third armatures 20-1 to 20-3 are configured and coupled to generate an induced current flow in the same direction with respect to an electric field in the same direction. And the one output terminal 22*a* of the second armature 20-2 and the other output terminal 22*b* of the third armature 20-3 constitute the output terminal or the first and second output terminals of the generating unit 100.

A magnetic pole piece 80 is provided between the field magnets 10 and the armature 20, respectively. In addition, preferably, the pole pieces 80 are also installed on the uppermost and lowermost sides of the armature or field magnet, that is, the upper side of the second armature 20-2 and the lower side of the third armature 20-3 in this embodiment, respectively. In addition, an insulating plate 90 is provided between the pole piece 80 and the field magnet 10 and between the pole piece 80 and the armature, respectively. At this time, preferably, the cross-sectional shape and size of the pole piece 80 are set to be the same as those of the field magnets 10-1 and 10-2 and the armature 20-1 to 20-3. In addition, although not specifically shown in the drawings, the cross-sectional shape and size of the insulating plate 90 is set larger than that of the field magnet 10 and the armature 20 for stable insulation.

The material of the insulating plate 90 is not limited to a specific one. In order to most effectively apply the magnetic field generated by the field magnet 10 to the armature 20, it is necessary to reduce the separation distance of the field magnet 10 to the armature 20 to a minimum or preferably to make them close together. The insulating plate 90 prevents leakage current or sparks between the field magnet 10 or the armature 20 and the pole piece 80, or the field magnet 10 and the armature 20 so that the field magnet 10 and the armature 20 can be as close as possible.

In addition, in a preferred embodiment of the present invention, a material having a high elastic modulus and excellent impact resistance, such as polyethylene terephthalate (PET), is employed as the material of the insulating plate 80. As will be described later, the core member 40 and the pole piece 80 provide a magnetic path of the magnetic field generated in the field magnet 10, and the generated magnetic field generated in the field magnet 10 circulate while linking the armature 20 as a whole.

As described above, the first and second magnetic fields 10-1 and 10-2 generate a first magnetic field and a second magnetic field each having opposite directions. Accordingly, when the first and second magnetic fields circulate through the core member 40 and the pole piece 80, the magnetization and demagnetization of the core member 40 and the pole piece 80 are alternately and repeatedly performed. In addition, such magnetization and demagnetization may give an impact to the core member 40, in particular, thereby causing minute shaking or vibration in the pole piece 80. When vibration or the like is generated in the core member 40 and the pole piece 80, instantaneous deformation or distortion occurs in the magnetic path that circulates through it, resulting in a change in the magnetic field linked to the armatures 20-1 to 20-3. As a result, the induced current generated in the armatures 20-1 to 20-3 may cause an undesirable change. The insulating plate 80 prevents the flow of alternating current generated through the armatures 20-1 to 20-3 from being unnecessarily distorted by minimizing the shaking or vibration of the pole piece 80 with high elasticity.

As described above, the core member 40 and the pole piece 80 are provided for the smooth flow of the magnetic field generated in the field magnet 10. As the material of the core member 40 and/or the pole piece 80, a ferromagnetic material, preferably silicon steel having high magnetic permeability and low coercive force may be employed. However, silicon steel has relatively low electrical conductivity and the internal resistance value is easily increased by light or heat applied from the outside. When a magnetic path is formed through the core member 40 and the magnetic pole 80, the flow of current may be generated by itself in response to the fluctuation of the magnetic field. Heat is generated in inverse proportion to conductivity. That is, there is a problem in that the magnetic energy generated in the field magnet 10 is lost as thermal energy.

Figure 6:
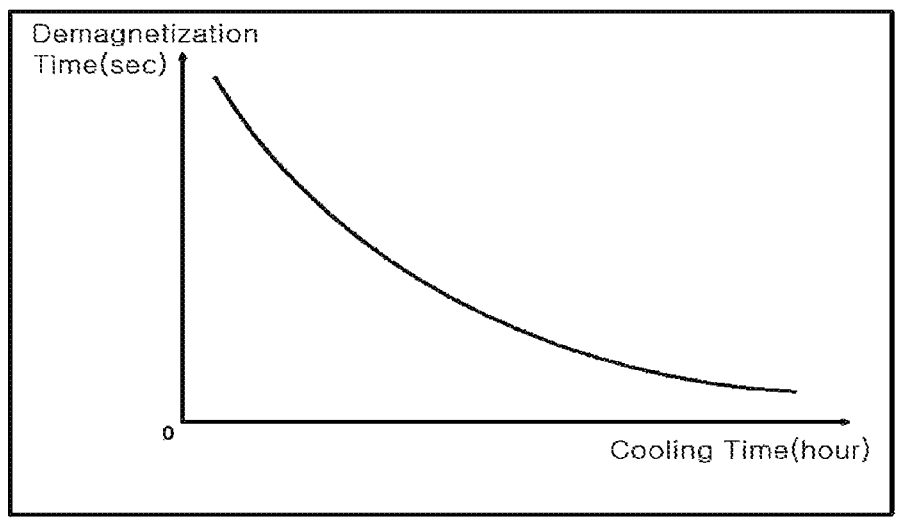
FIG. 6 is a graph showing the demagnetization time characteristics according to the cooling time of pure iron.

In another preferred embodiment of the present invention, pure iron, more preferably heat-treated pure iron is employed as the material of the core member 40 and/or the pole piece 80. Pure iron has high magnetic permeability and excellent electrical conductivity, but has relatively high coercive force. Since magnetic fields are applied to the core member 40 and the pole pieces 80 alternately or in various ways from the first field magnet 10-1 and the second field magnet 10-2, or the first field magnet 10-1 and the first and second magnetic fields generated by the second field magnet 10-2 are alternately applied, it is required for the material to have a fast demagnetization time, that is, a low coercive force. According to the research conducted by the present inventors, when pure iron is heated to a certain temperature or higher and then cooled slowly, the demagnetization time is shortened in response to the cooling time. FIG. 6 is a graph showing the demagnetization time characteristics according to the cooling time of pure iron. As a result of the study, it was confirmed that the demagnetization time could be shortened to 1/450 second or less if the temperature of pure iron heated to a certain temperature was gradually cooled for a sufficient time for more than 10 hours. In addition, if the cooling time of pure iron is delayed, an additional effect of improving magnetic permeability and electrical conductivity is obtained.

Figure 7:
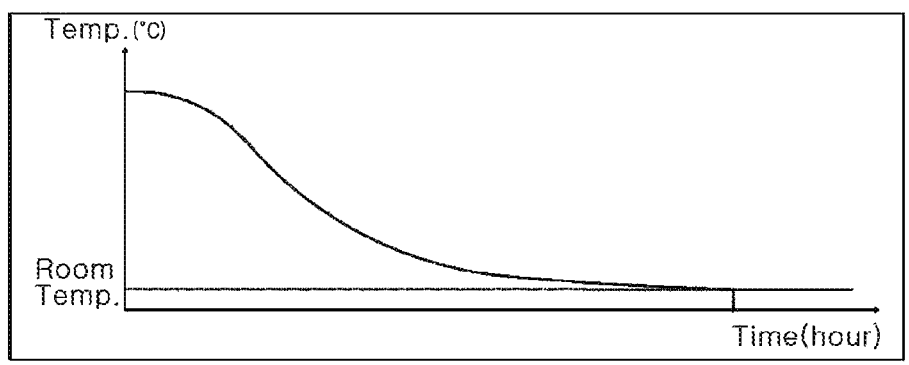
FIG. 7 is a graph showing a cooling characteristic curve according to time when the core member 40 and the pole piece 80 are heat-treated.

In the present invention, first, the core member 40 and the pole piece 80 are manufactured using pure iron, and then heat treatment is performed. The heat treatment is performed using, for example, a solid fuel such as black coal or white coal, preferably white coal. That is, during the heat treatment, the core member 40 and the pole piece 80 are put in a kiln together with the white coal, and the white coal is burned to heat the core member 40 and the pole piece 80 to 1000 to 1300 degrees or more. And by leaving the core member 40 and the pole piece 80 together at room temperature as it is, the white coal is naturally burned and extinguished, and then the core member 40 and the pole piece 80 are naturally cooled together with the white coal do. In this way, the temperature of the core member 40 and the pole piece 80 is gradually lowered in the process of burning and extinguishing the white coal, and thereafter, the core member 40 and the pole piece 80 are heated to room temperature by the latent heat of the white coal. It takes a considerable amount of time to cool down. FIG. 7 is a graph showing cooling characteristic curves according to time of the core member 40 and the pole piece 80 that are heat-treated through the above-described method. And, after the heat treatment is finished, impurities such as white charcoal are removed from the core member 40 and the pole piece 40, and finally, rust prevention treatment is performed with oil or the like.

FIGS. 4 and 5, in the case of assembling the generating unit 100, the core member 40 is first fastened to the base member 30. Then, while inserting the pole piece 80 and the insulating plate 90 on the outside of the core member 40, sequentially stacking the armatures 20-1 to 20-3 and the field magnets 10-1 and 10-2 alternately, and then the cover 60 and the fastening member 70 are coupled. And finally, the connection between the first and second field magnets 10-1 and 10-2 and the first to third armatures 20-1 to 20-3 is executed using the connecting wires 201 and 202, by performing a connection between the generating unit 100.

The generating unit 100 is provided with first and second input terminals 12-1 and 12-2 for supplying a field magnet current, and output terminals 22a and 22b for outputting alternating current. When the present generating unit 100 is driven, the first and second field magnet currents are alternately supplied through the first and second input terminals 12-1 and 12-2, so that the first field magnet 10-1 and the second field magnet 10-2 are selectively and alternately driven. When a field magnet current flows through the line 11 of the first or second field magnet 10-1 or 10-2, a magnetic field is formed in a vertical direction corresponding to the winding direction of the line 11 or the current flow direction. When the magnetic field generated by the first field magnet 10-1 is referred to as a first magnetic field and the magnetic field generated by the second field magnet 10-2 is referred to as a second magnetic field, the first magnetic field and the second magnetic field have the same magnetic field directions and will be opposed to each other. The direction in which the magnetic field is formed can be defined by Ampere's right hand screw rules.

Figure 8:
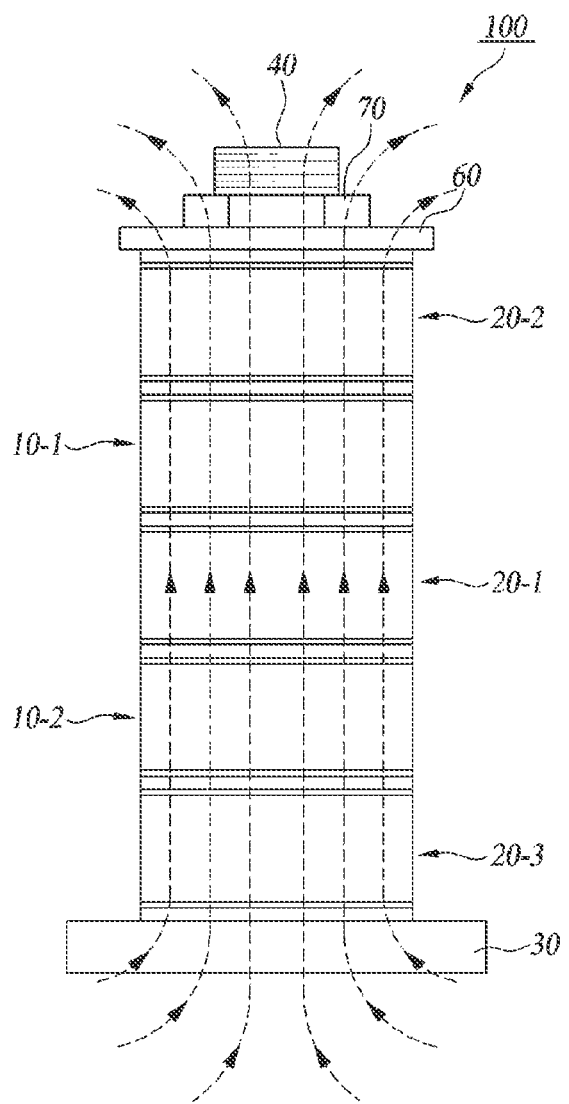
FIG. 8 is a diagram schematically showing the shape of the magnetic field formed in the generating unit 100 or the first or second magnetic field.

FIG. 8 is a diagram schematically showing the shape of the magnetic field formed in the generating unit 100 or the first or second magnetic field. When a field magnet current flows through the first or second field magnets 10-1 or 10-2 in the generating unit 100, the first or second field magnets 10-1, 10-2, a magnetic field is formed at the first and second magnets 10-1 and 10-2 according to the Ampere's right hand screw rules, and the magnetic field thus formed flows through the pole piece 80 and the core 40. Accordingly, the first or second magnetic field flows through the entire upper and lower sides of the generating unit 100 as shown in FIG. 8. The first and second magnetic fields are linked in a vertical direction with respect to the line 21 of the armatures 20-1 to 20-3. And in the line 21 of the armatures 20-1 to 20-3, a current flow is generated in a predetermined direction corresponding to the direction of the magnetic field and the winding direction of the line 21. At this time, the magnitude of the induced current will correspond to the strength of the magnetic field and its change amount. Whenever the first magnetic field and the second magnetic field alternate, the first or second magnetic field is linked in the line of the armatures 20-1 to 20-3, and the flow of the induced current corresponds to the alternating first and second magnetic fields, so the direction is changed. The frequency of the AC power drawn from the output terminal 22 of the armatures 20-1 to 20-3 is determined by the alternating period of the field magnet current.

Figure 9:
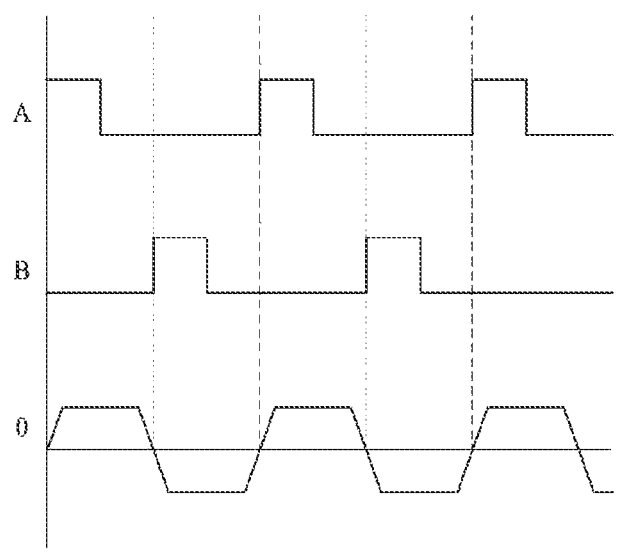
FIG. 9 is a waveform diagram illustrating an example of a field magnet current supplied to the generating unit 100 and an alternating current output from the generating unit 100 accordingly.

FIG. 9 is a waveform diagram illustrating an example of a field magnet current supplied to the generating unit 100 and an alternating current output from the generating unit 100 accordingly. In FIG. 9, A shows an example of the first field magnet residual supplied to the first input terminal 12-1, B shows an example of the second field magnet current supplied to the second input terminal 12-2, and O shows an example of the output AC current output through the output terminals 22a and 22b of the generating unit 100. The waveform of the output AC current O in FIG. 9 shows one typical example of the AC output outputted from the AC generator, and the output waveform will be transformed into various forms depending on the current magnitude and pulse width of the first and second field magnet currents A and B.

FIGS. 1 to 3, the non-rotational AC generator according to the present invention is configured with a plurality of generating units 100-1 to 100-n. As described above, a field magnet current is supplied to each of the input terminals 12-1 and 12-2 of the generating units 100-1 to 100-n, and output terminals 22a and 22b of the generating units 100-1 to 100-n are coupled in series or parallel with each other. One or more current sources are coupled to the generating unit 100 to supply a field magnet current. The first and second field magnets 10-1 and 10-2 provided in the generating units 100-1 to 100-n are coupled to a DC source in series or in parallel. In addition, a switching means such as an insulated gate bipolar transistor (IGBT) may be provided to alternately drive the first field magnet 10-1 and the second field magnet 10-2 and adjust the alternating period. A pulse width modulation (PWM) control means may be provided to control the pulse width of the current. The supply and control of the first and second field magnet currents through the switching means and the PWM control means are described in detail in Korean Patent Registration No. 10-1913746.

The generating units 100-1 to 100-$n$ are driven synchronously. That is, the first field magnet 10-1 and the second field magnet 10-2 of each generating unit 100 are driven with the same alternating cycle. Of course, one generating unit 100 and another generating unit 100 may have different duty ratios for driving the field magnet 10 within the same driving cycle.

Figure 10:
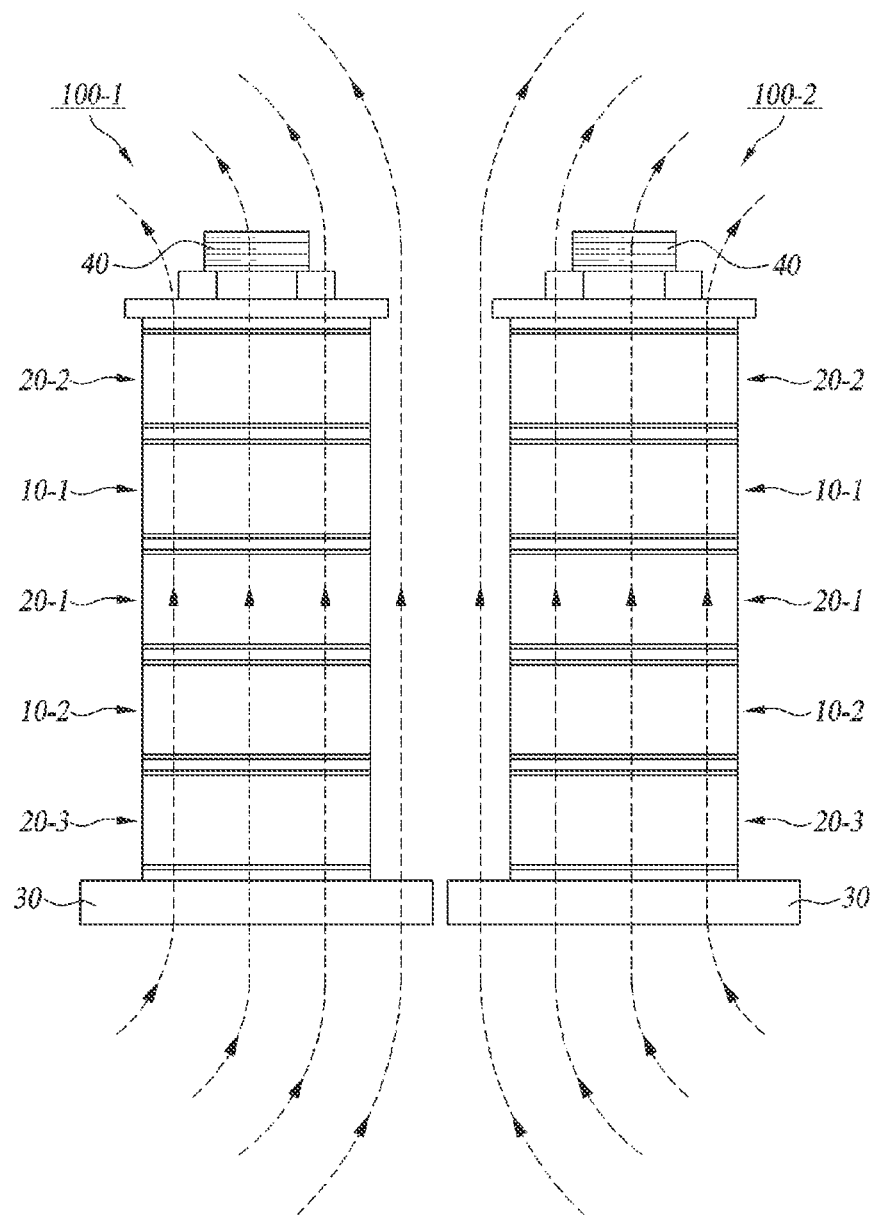
FIG. 10 is a diagram schematically showing the form of a magnetic field formed in the generating units 100-1 and 100-2 in the non-rotating AC generating device shown in FIG. 1.

FIG. 10 is a diagram schematically showing the flow of the overall magnetic field generated in the non-rotating AC generator, which corresponds to FIG. 1. In the drawing, the first generating unit 100-1 and the second generating unit 100-2 are driven synchronously. That is, the first field magnet 10-1 of the first generating unit 100-1 and the first field magnet 10-1 of the second power generation unit 100-2 have the same driving section, and the second field magnet 10-2 of the first generating unit 100-1 and the second field magnet 10-2 of the second generating unit 100-2 have the same driving section. Accordingly, the magnetic fields generated by the first generating unit 100-1 and the second generating unit 100-2 have the same magnetic path. As described above, the first and second generating units 100-1 and 100-2 are disposed adjacent to each other. Accordingly, the first or second magnetic field generated by the first generating unit 100-1 and the first or second magnetic field generated by the second generating unit 100-2 overlap each other, and the first generating unit 100-1 and the second generating unit 100-2 as a whole function as one generating unit.

The individual generating unit 100 generates an induced current corresponding to a magnetic field generated by the first or second field magnets 10-1 or 10-2 provided by itself. However, as shown in FIGS. 1 and 10, when the synchronously driven first generating unit 100-1 and the second generating unit 100-2 are disposed adjacently, and an induced current is additionally generated to the first or second generating unit 100-1 and 100-2, respectively, by the magnetic field generated by the adjacent generating unit. That is, the amount of induced current generated by the adjacently disposed first and second generating units 100-1 and 100-2 becomes larger than those of the separately installed first and second generating units 100-1 and 100-2. The increase in the induced current increases as the number of generating units 100 increases as shown in FIGS. 2 and 3.

Figure 11:
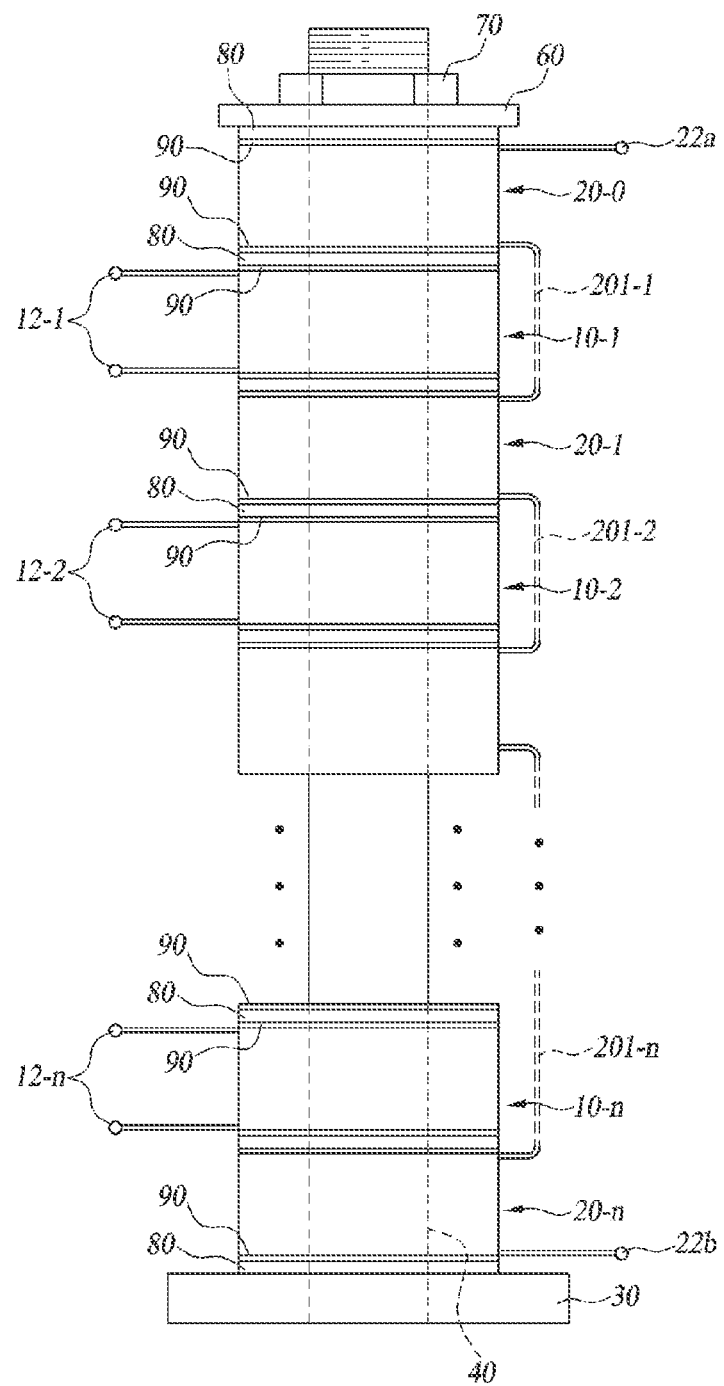
FIG. 11 is a front view showing another configuration example of the generating unit 100.

FIG. 11 is a front view showing another configuration example of the generating unit 100. In this embodiment, the core member 40 is combined to the base member 30, and a plurality of field magnet magnets 10-1 to 10-$n$ and a plurality of armatures 20-0 to 20-$n$ are stacked and combined alternately to the core member 40 by the medium of the insulating plate 80 and the pole piece 90. At this time, the armatures 20-0 to 20-$n$ are configured and coupled to generate an induced current in the same direction with respect to the same magnetic field as in FIG. 4.

In contrast, in the field magnets 10-1 to 10-$n$, n/2 field magnets among n field magnets constitute a first field magnet group, and the remaining n/2 field magnets constitute a second field magnet group. Preferably, the odd field magnets (10-1, 10-3, . . . , 10-($n$-1)) constitutes the first field magnet group, and the even field magnet (10-2, 10-4, . . . , 10-$n$)) constitutes the second field magnet group. In this case, the configuration of each field magnet group can be performed by appropriately setting the winding direction of the lines constituting each field magnet as described above, or by appropriately setting the connection method of the field magnet current supplied to these field magnets. The first field magnet group and the second field magnet group are driven synchronously, respectively, and the first field magnet group and the second field magnet group are driven alternately, so that a first magnetic field and a second magnetic field are formed as a whole, the field magnets 10-1 to 10-$n$ are driven in opposite directions. Field magnets constituting the first field magnet group and the second field magnet group may be wired in various ways. The input terminals of the first field magnet group and the second field magnet group may be connected in series with each other, so that the first and second field magnet groups may be connected in series with respect to one field magnet current input, respectively. Also, each of the first field magnet group and the second field magnet group may be connected in parallel with respect to one field magnet current input. In addition, a plurality of current sources is provided to supply a field magnet current to the field magnets 10-1 to 10-$n$, and the first or second field magnet group is divided into a plurality of sub field magnet groups in correspondence to the current sources, and each sub field magnet groups may be coupled in series or parallel to the current source respectively. The connection method of the field magnets 10-1 to 10-$n$ and the number of current sources for this are not specified, and will be appropriately selected according to the amount of output power to be generated through the AC generator.

In this embodiment, a plurality of field magnets 10-1 to 10-$n$ and armatures 20-0 to 20-$n$ are provided, so that various AC power can be generated as needed. In addition, since other parts are substantially the same as in the above-described embodiment, the same reference numerals are attached to the same parts as in the embodiment, and detailed descriptions thereof are omitted.

Figure 12:
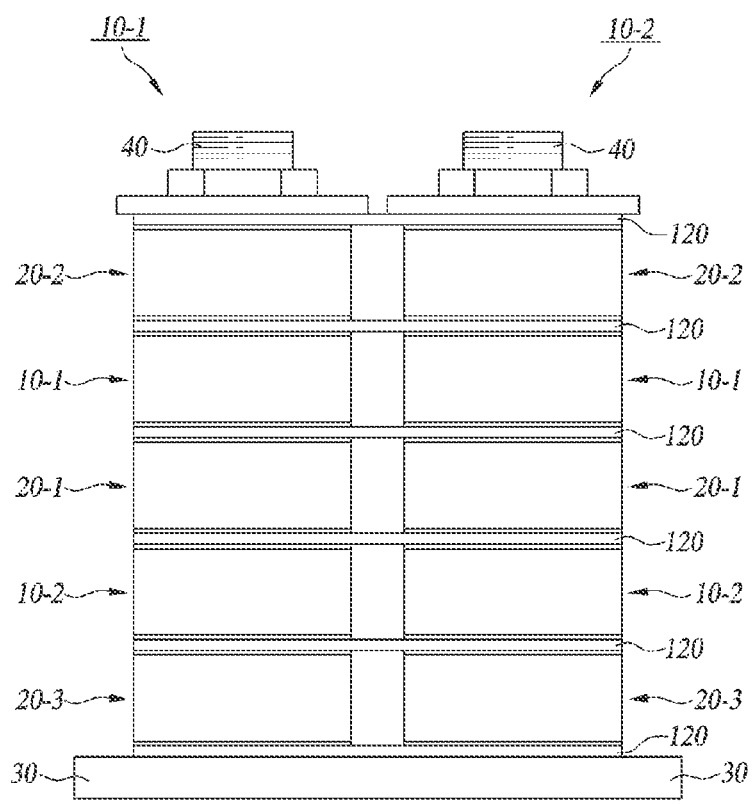
FIG. 12 is a front view showing the configuration of a non-rotating AC generating device according to a second embodiment of the present invention.

FIG. 12 is a front view showing the configuration of a non-rotating AC generator according to a second embodiment of the present invention. A plurality of generating units 100 in this embodiment, in this example, the lower portions of the first generating unit 100-1 and the second generating unit 100-2 are coupled with a single base member 30, and the upper portions thereof are coupled to each other by the pole piece 120. That is, the plurality of generating units 100 constituting the AC generator are integrally coupled through the pole pieces 120.

Figure 13:
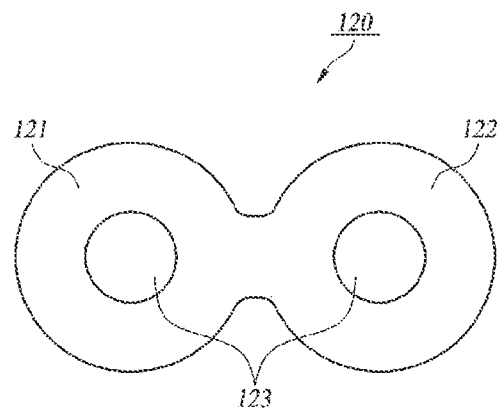
FIGS. 13 and 14 are plane views showing another configuration example of the pole pieces 120 and 140 employed in the non-rotating AC generating device.

FIG. 13 is a plane view illustrating the configuration of the pole piece 120 employed in the AC generator of FIG. 1. In the drawing, the pole piece 120 includes a first pole piece part 121 for the first generating unit 100-1 and a second pole piece part 122 for the second generating unit 100-2 are integrally coupled to each other. Holes 123 are formed at the central portions of the first pole piece 121 and the second pole piece 122 and the core members 40 of the first and second generating units 100-1 and 100-2 are respectively inserted into the holes.

Figure 14:
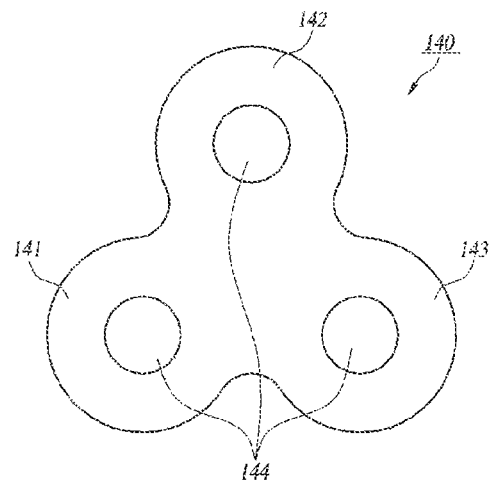

FIG. 14 is a plane view showing the configuration of the pole piece 140 employed in the AC generator of FIG. 2. In FIG. 14, the pole piece 140 includes a first pole piece part 141 for the first generating unit 100-1 and a second pole piece part 142 for the second power generating unit 100-2 and a third pole piece part of a third generating unit 100-3 are integrally coupled and configured, and through holes 144 are formed at the central portion of the first to third pole piece parts 141 to 143 and the core members 40 of the first to third generating units 100-1 to 100-3 are inserted into the holes.

In this embodiment, the shapes of the pole pieces 120 and 140 are not specified, and may be appropriately changed according to the configuration of the AC generator. In this embodiment, a plurality of generating units constituting the AC generator are coupled to each other through the pole pieces. Accordingly, when external vibration or impact is applied, the flow of the power generation unit is minimized. In addition, since the pole pieces 120 and 140 are mutually coupled through the space between the generating units 100, the pole pieces 120 and 140 have the effect of more stabilizing the flow of the magnetic field through the space between the generating units 100. And other parts are substantially the same as in the above-described embodiment.

Figure 16:
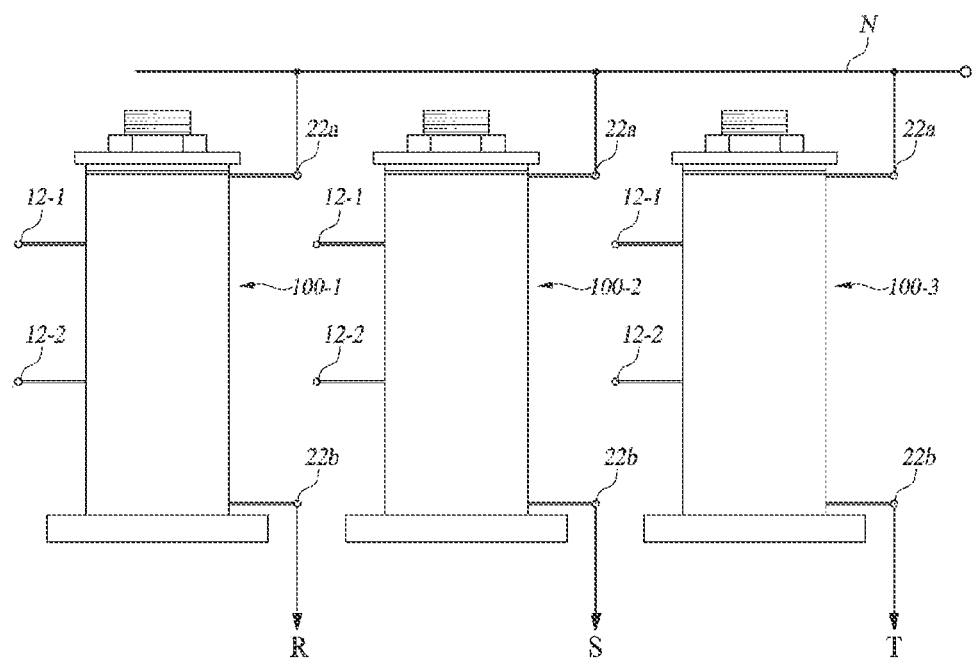
FIG. 16 is a configuration diagram schematically showing a configuration example of a non-rotational AC generating device according to a fourth embodiment of the present invention.

FIG. 16 is a front view showing a configuration example of a non-rotating AC generator according to the present invention. In the drawing, the non-rotating AC generator includes first to third generating units 100-1 to 100-3. These generating units 100-1 to 100-3 are for generating alternating current of R-phase, S-phase and T-phase, respectively. The generating units 100-1 to 100-3 have first and second input terminals 12-1 and 12-2 and first and second output terminals 22a and 22b, respectively. At this time, the first and second input terminals 12-1 and 12-2 are properly coupled to a DC source. The combination of the generating units 100-1 to 100-3 and the DC source will be described in more detail later. In addition, the first output terminal 22a of the generating units 100-1 to 100-3 is coupled to the neutral wire N, and alternating currents of R phase, S phase and T phase are output from the second output terminal 22b, respectively.

Figure 18:
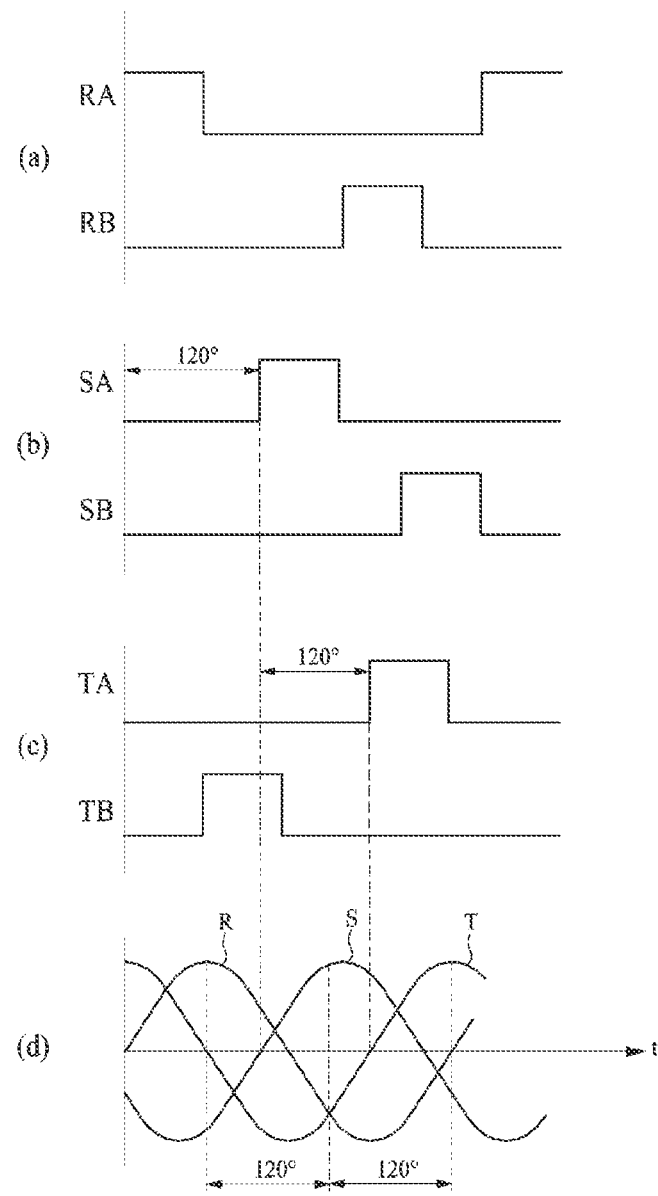
FIG. 18 is a waveform diagram illustrating an example of a field magnet current supplied to the first to third generating units 100-1 to 100-3 and a three-phase alternating current output from the AC generating device.

In FIG. 16, the non-rotating AC generator is provided with first to third generating units 100-1 to 100-3 for generating R-phase, S-phase, and T-phase AC, respectively. These generating units 100-1 to 100-3 are driven by field magnet currents or field magnet pulses having different phases from each other. FIG. 18 is a waveform diagram illustrating an example of a field magnet current supplied to the first to third generating units 100-1 to 100-3 and a three-phase alternating current output from the AC generator. FIG. 18 (a) is an example of a field magnet current supplied to the first generating unit 100-1 generating an R-phase alternating current, FIG. 18 (b) is an example of a field magnet current supplied to the second generating unit 100-2 generating an S-phase alternating current, and FIG. 18 (c) is an example of a field magnet current supplied to the third generating unit 100-3 generating a T-phase alternating current. In the figure, RA, SA, and TA denote field magnet currents applied to the first field magnet 10-1, and RB, SB, and TB denote field magnet currents supplied to the second field magnet 10-2. As shown in FIG. 18 (d), the three-phase alternating current includes three alternating currents having an R-phase, an S-phase, and a T-phase, and they have a phase difference of 120 degrees from each other. As described above, in the present invention, the generating unit 100 is driven by an input field magnet current or field magnet pulse, and at this time, the frequency and phase of the alternating current generated by the generating unit 100 is determined by the period and phase of the field magnet pulse. Accordingly, when field magnet pulses having a phase difference of 120 degrees are supplied to the first to third generating units 100-1 to 100-3 as shown in FIG. 18, respectively, the first to third generating units 100-1~100-3), RST three-phase alternating current can be generated.

In the above-described embodiment, first to third generating units 100-1 to 100-3 for generating alternating currents of R-phase, S-phase, and T-phase are provided. And the phase of the alternating current generated therefrom can be appropriately set by adjusting the phase of the field magnet current or the field magnet pulse supplied to these generating units. In addition, in the above embodiment, each generating unit (100-1 to 100-3) becomes possible to properly set the voltage of the alternating current outputted from the generating unit (100-1 to 100-3) through a method of adjusting the turns ratio of the field magnet 10 and the armature 20.

Figure 17:
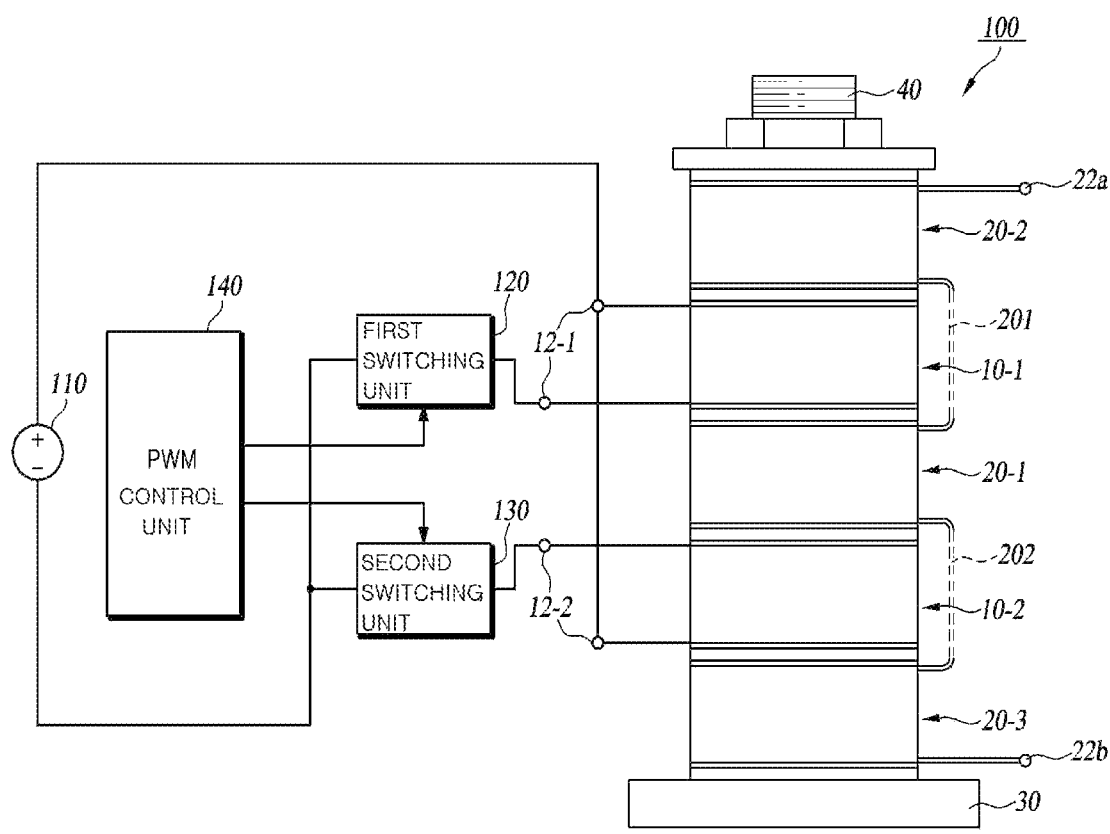
FIG. 17 is a configuration diagram showing an example of a connection method between the generating unit 100 and the DC source 110.

FIG. 17 is a configuration diagram illustrating an example of a connection method between the generating unit 100 and the DC source 110. In the drawing, in the first field magnet 10-1, one side of the first input terminal 12-1 is coupled to the positive (+) terminal of the DC source 110, and the other side thereof is coupled to the negative (−) terminal of DC source 110 through the first switching unit 120. In the second field magnet 10-2, the other side of the second input terminal 12-2 is coupled to the positive (+) terminal of the DC source 110, and one side thereof is coupled to the negative (−) terminal of DC source 110 through the second switching unit 130. That is, the first field magnet 10-1 and the second field magnet 10-2 are coupled to the DC source 110 in the reverse direction. Accordingly, field magnet currents are supplied to the first and second field magnets 10-1 and 10-2 in the reverse direction, and accordingly, the magnetic fields generated from first and second field magnets 10-1 and 10-2 are formed in opposite directions. The first and second switching units 120 and 130 are controlled by a pulse width modulation (PWM) control unit 140. The PWM control unit 140 alternately drives the first and second switching units 120 and 130 to alternately drive the first field magnet 10-1 and the second field magnet 10-2, and by controlling the pulse widths of the field magnet currents for the first field magnet 10-1 and the second field magnet 10-2, that is, the duty ratio, the AC output of the power generation unit 100 is controlled.

When the PWM control unit 140 drives the first or second switching units 120 and 130 so that a field magnet current flows through the line 11 of the first or second field magnets 10-1, 10-2, a magnetic field is formed in a vertical direction corresponding to the flow direction of the current of the line 11. When the magnetic field generated by the first field magnet 10-1 is referred to as a first magnetic field and the magnetic field generated by the second field magnet 10-2 is referred to as a second magnetic field, the first magnetic field and the second magnetic field have the opposite magnetic field directions. The direction in which the magnetic field is formed can be defined by Ampere's right hand screw rules.

An embodiment according to the present invention has been described above. However, the present invention is not limited to the above embodiments and may be implemented with various modifications. For example, in the above embodiment, it has been described that the field magnet 10 and the armature 20 constituting the generating unit 100 are sequentially installed alternately one by one. However, the present invention may be modified and practiced in various ways, for example, by alternately installing two continuous field magnets and one armature.

Figure 15:
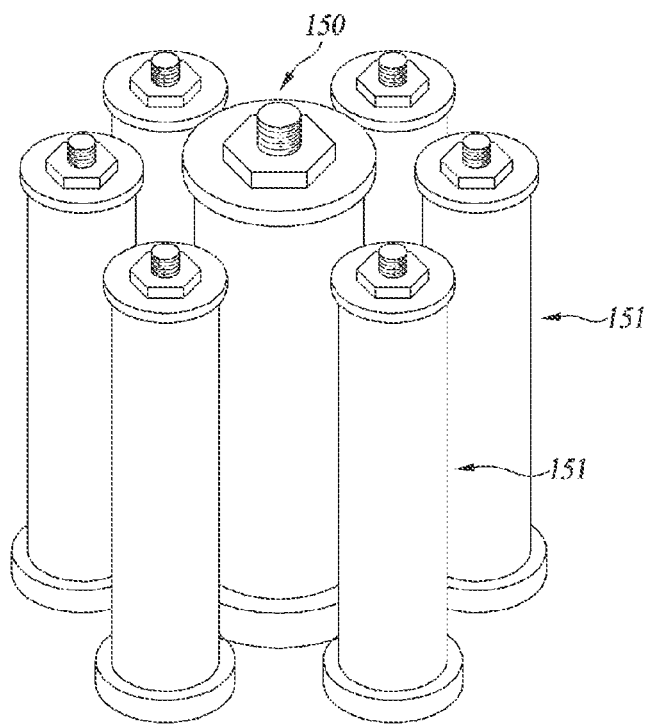
FIG. 15 is a perspective view showing the configuration of a non-rotating AC generating device according to a third embodiment of the present invention.

In addition, in the above-described embodiment, it has been described that the AC generating device is configured by combining a plurality of generating units having the same size and configuration, but the present invention, as shown in FIG. 15, a combination of the first and second generating units 150 and 151 which have sizes different from each other can also be preferably applied and implemented.

In addition, in the above-described embodiment, it has been described that a plurality of generating units 100 are coupled through the pole pieces 120 and 140, but in the generating unit 100, a method of coupling through an insulating plate 90 or the upper cover 60, in addition to the pole pieces 120 and 140, may also be preferably employed.

In addition, in the above embodiment, each of the generating units 100-1 to 100-3 for generating alternating currents of R-phase, S-phase, and T-phase may be composed of a plurality of generating units. And at this time, the plurality of generating units will have their first and second output terminals 22a and 22b coupled in series or parallel to each other.

In addition, although the present invention has been described with respect to a three-phase AC generator in the above embodiment, the present invention can be applied and implemented in the same manner to a multi-wire poly-phase AC generator.

The non-rotating AC generator according to the present invention includes a plurality of generating units, each of which is disposed adjacent to each other, and an input side and an output side are respectively coupled in series or parallel. Each generating unit has a structure in which a field magnet and an armature are stacked, and each generating unit operates synchronously with other generating units so that multiple generating units function as one generating unit. The AC generator of the present invention can provide excellent power generation efficiency by synergizing the magnetic field generated by one generating unit by acting on the other generating unit.

In addition, the non-rotating AC generating device according to the present invention includes first to third generating units for generating alternating currents of R-phase, S-phase, and T-phase, and only supplies field magnet currents having a phase difference to these generating units. to create a three-phase alternating current. In addition, in the present invention, the phase difference between R-phase, S-phase, and T-phase alternating current can be arbitrarily adjusted by adjusting the phase of the field magnet current supplied to the first to third generating units, and R-phase, S-phase, and T-phase AC voltage can be set appropriately by adjusting the turns ratio of the field magnet and armature of each generating unit.

The invention claimed is:

1. A non-rotating alternating current (AC) generating device for generating an AC current, comprising:
   two or more generator units which are placed next to each other, wherein the generator unit includes a round bar-shaped core member,
   a field magnet in which an electric line is wound and a first hollow portion is formed in a central portion, the field magnet disposed on the outside of the core member through the first hollow,
   an armature in which an electric line is wound and a second hollow portion is formed in a central portion, the armature disposed on the outside of the core member through the second hollow portion,
   a pole piece which is provided between the field magnet and the armature, and insulating plates which are disposed between the field magnet and the pole piece and between the armature and the pole piece, and
   wherein the generator units are connected in series or parallel to input and output terminals, and
   wherein the generating unit has a pole piece integrally configured with respect to other generating units.

2. The non-rotating AC generating device according to claim 1, wherein a hollow is provided in the central portion of the core member along the longitudinal direction.

3. The non-rotating AC generating device according to claim 1, wherein an insulating material is further disposed between the core member and the first or second hollow part.

4. The non-rotating AC generating device according to claim 1, wherein the insulating plate is made of a highly elastic material.

5. The non-rotating AC generating device according to claim 1, wherein the core member or the pole piece is made of pure iron and subjected to heat treatment.

6. The non-rotating AC generating device according to claim 1, wherein the generating unit has an insluting plate integrally configured with respect to other generating units.

7. The non-rotating AC generating device according to claim 1, wherein a plurality of the field magnet and the armature are provided, and the field magnet and the armature are alternately arranged.

8. The non-rotating AC generating device according to claim 7, wherein the plurality of armatures is connected in series with each other.

9. The non-rotating AC generating device according to claim 7, wherein the plurality of field magnets is divided into a first field magnet group and a second field magnet group, and the first field magnet group and the second field magnet group are alternately driven, so that the first and second magnetic fields are formed, respectively, and
   the first and second magnetic fields have opposite directions.

10. The non-rotating AC generating device according to claim 1, wherein at least one of the generating units is different in size from the other.

11. A non-rotating alternating current (AC) generating device in which R-phase and S-phase and T-phase alternating current with mutual phase difference are generated, the non-rotating alternating current (AC) generating device comprising:
    a first power generating unit for generating an R-phase alternating current,
    a second generating unit for generating an S-phase alternating current, and
    a third power generating unit for generating a T-phase alternating current;
    wherein in the first to third generating units, a first output terminal is coupled to a neutral wire, and R-phase, S-phase or T-phase AC are outputted through a second output terminal, respectively,
    wherein the first to third generating units comprises
    a round bar-shaped core member,
    a field magnet in which an electric line is wound and a first hollow portion is formed in a central portion, the field magnet disposed on the outside of the core member through the first hollow,
    an armature in which an electric line is wound and a second hollow portion is formed in a central portion, the armature disposed on the outside of the core member through the second hollow portion, a pole piece which is provided between the field magnet and the armature, and
    insulating plates which are disposed between the field magnet and the pole piece and between the armature and the pole piece, and
    wherein a field magnet current having a mutual phase difference is supplied to each field magnet of the first to third generating units, and wherein the first to third generating units, each generating unit has a pole piece integrally configured with respect to other generating units.

12. The non-rotating AC generating device according to claim 11, wherein a plurality of the field magnet and the armature are provided, and the field magnet and the armature are alternately arranged.

13. The non-rotating AC generating device according to claim 11, wherein a hollow is provided in the central portion of the core member along the longitudinal direction.

14. The non-rotating AC generating device according to claim 11, wherein an insulating material is further disposed between the core member and the first or second hollow part.

15. The non-rotating AC generating device according to claim 11, wherein the insulating plate is made of a highly elastic material.

16. The non-rotating AC generating device according to claim 11, wherein the core member or the pole piece is made of pure iron and subjected to heat treatment.

17. A non-rotating AC generating device for generating multi-phase AC current with mutual phase differences, comprising:
a plurality of generator units for generating alternating currents with different phases,
wherein the generator unit includes
a round bar-shaped core member,
a field magnet in which an electric line is wound and a first hollow portion is formed in a central portion, the field magnet disposed on the outside of the core member through the first hollow,
an armature in which an electric line is wound and a second hollow portion is formed in a central portion, the armature disposed on the outside of the core member through the second hollow portion,
a pole piece which is provided between the field magnet and the armature, and
insulating plates which are disposed between the field magnet and the pole piece and between the armature and the pole piece, and
wherein a field magnet current having a mutual phase difference is supplied to each field magnet of the plurality of generating units, and
wherein in a plurality of generating units, each generating unit has a pole piece integrally configured with respect to other generating units.

* * * * *

UNITED STATES PATENT AND TRADEMARK OFFICE
CERTIFICATE OF CORRECTION

PATENT NO. : 12,176,799 B2
APPLICATION NO. : 17/925134
DATED : December 24, 2024
INVENTOR(S) : Woo Hee Choi et al.

Page 1 of 1

It is certified that error appears in the above-identified patent and that said Letters Patent is hereby corrected as shown below:

On the Title Page

Left column, Item (71), "Woo Hee Choi, Seoul (KR); Nan Kyung Hwang, Seoul (KR); Hyung Ju Yoo, Seoul (KR); Sung KwonYu, Seoul (KR)" should read -- Woo Hee Choi, Seoul (KR); Nan Kyung Hwang, Seoul (KR); Hyung Ju Yoo, Seoul (KR) --

Left column, below Item (71), add -- (73) Assignees: Woo Hee Choi, Seoul (KR); Nan Kyung Hwang, Seoul (KR); Hyung Ju Yoo, Seoul (KR) --

Signed and Sealed this
Eighteenth Day of March, 2025

Coke Morgan Stewart
*Acting Director of the United States Patent and Trademark Office*